Figure 1:
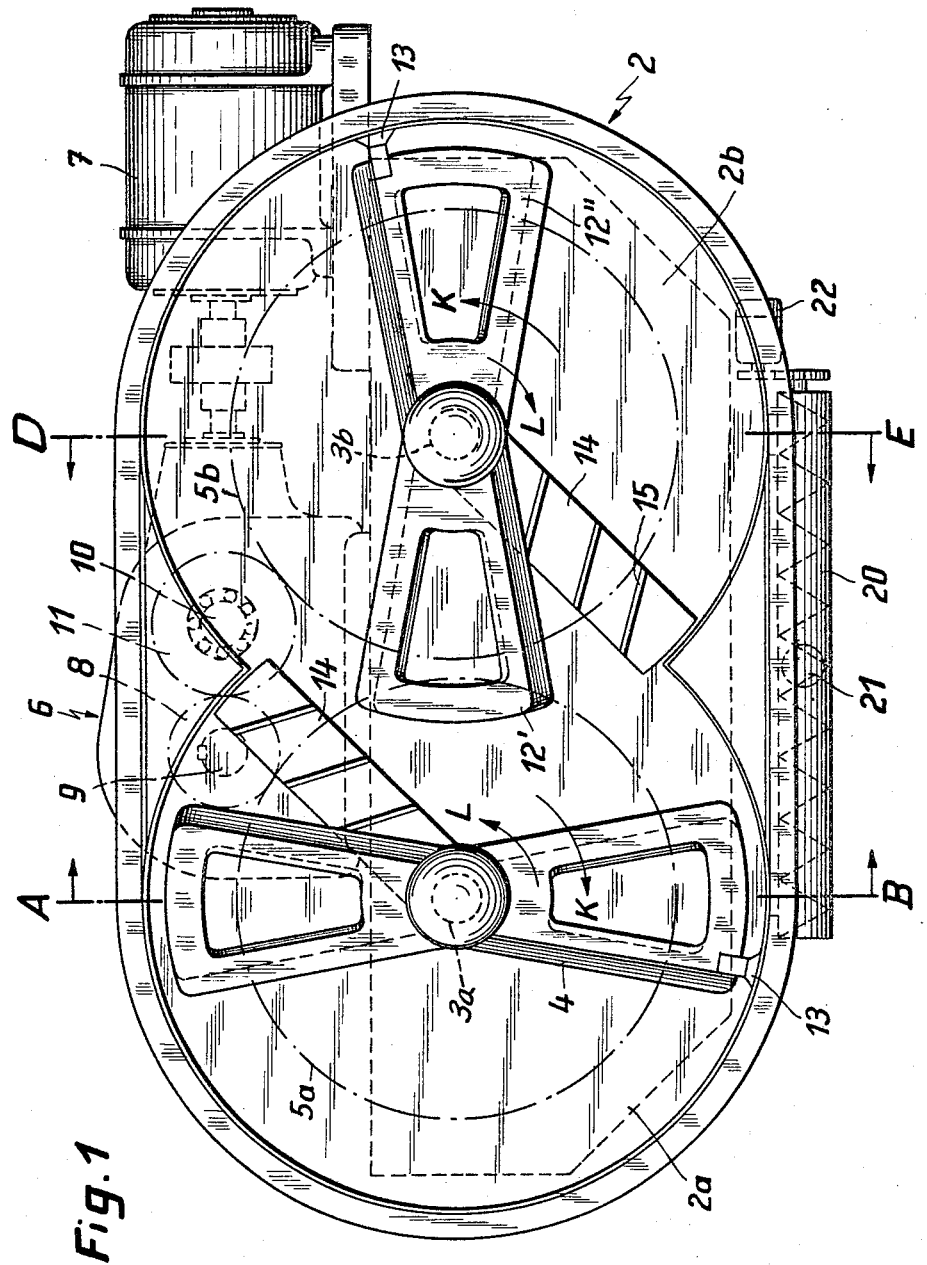

Nov. 15, 1966  G. HÜBNER  3,285,582
MACHINE FOR TREATING, ESPECIALLY DRY-CONCHING AND
EMULSIFYING CHOCOLATE MASSES OR THE LIKE
Filed Feb. 24, 1964  3 Sheets-Sheet 1

INVENTOR.
Gerhard Hübner
BY
Beaman & Beaman
attys

3,285,582
MACHINE FOR TREATING, ESPECIALLY DRY-CONCHING AND EMULSIFYING CHOCOLATE MASSES OR THE LIKE

Gerhard Hübner, Hamburg-Blankenese, Germany, assignor to Hermann Bauermeister Maschinenfabrik und Mühlenbau G.m.b.H., Hamburg-Altona, Germany
Filed Feb. 24, 1964, Ser. No. 346,861
Claims priority, application Germany, Feb. 26, 1963, B 70,882
16 Claims. (Cl. 259—41)

The invention relates to a machine for treating, especially dry-conching and emulsifying chocolate masses or the like, having an open-top twin-trough formed of two halves intersecting each other in the plan view, and a rotatable shaft in each half of the twin trough, said shafts being aligned in parallel to said halves and provided with at least one vane projecting therefrom.

The dry-conching of the chocolate mass is generally known. The conching, in general, partially serves the purpose of drying the chocolate mass, i.e. extracting a certain amount of water thereof. Simultaneously, off-odour components are intended to be evaporated thereby and an intimate contact is intended to be effected between the individual particles of the mass and the oxygen of the air. The second function of the conching consists in that the mass is emulsified after the moisture has been extracted, and passed over into a liquid state in which it may be formed into slabs. The liquefaction may be effected the quicker the more intensively the extraction of moisture has been effected.

It is just this knowledge that has led to first drying the powdered mass and moving it loosely while supplying heat, and initiating the emulsifying process only after a certain period of time has elapsed after the chocolate mass has been sufficiently dried with the aid of the drying movement, in such a manner that the mass will now be compressed and homogenized. In principle, the chocolate mass has cocoa butter added later. But this need be done only towards the end of the dry-conching process. In this connection, the intensive dry-conching manifests itself especially in a saving of cocoa butter.

With a thoroughly dry-conching chocolate mass, the fat content may for instance be less by 2–4% in comparison with a cocoa mass that has been emulsified right from the beginning, in which the emulsification was initially obtained by adding cocoa butter and lecithin at the beginning. As the cocoa butter costs many times as much as the remaining components of the chocolate mass, a lowering of the fat content is extremely important from an economical standpoint. Besides, the demand for foodstuffs and luxuries containing less fat is nowadays stronger than ever.

Therefore, the invention is based on the problem of providing an especially simple and inexpensive machine having a large evaporation surface which effects a dry-conching even with the lowest possible energy consumption. In this connection, one starts from a machine of the type that has been mentioned at the beginning. It will be remembered in this connection that for instance a refining machine for chocolate mass is known which comprises likewise such a twin-trough and such rotating shafts provided with vanes. The twin trough, the base plan of which has about the shape of a figure eight and the shafts arranged therein are disposed exactly vertically. The two shafts in the individual trough members are running both in the same direction and are each comprising a vane having a vane surface ascending in the direction of rotation. However, a ploughing and loosening of the chocolate mass is taking place with this machine only to a certain extent which often is not satisfactory because the chocolate mass is essentially only ploughed through and not properly loosened.

Now, the invention starts from the idea of ploughing through the chocolate mass likewise by means of vanes fastened to the rotating shafts said vanes comprising surfaces ascending in the direction of the rotation provided for the loosening process, however, in so doing, having the vanes again and again, at least partially, dip into and emerge from the chocolate mass, in such a manner that in the loosening operation, the chocolate masses are conveyed from the outer regions of the twin trough disposed farthest away from each other, to the common center, are lifted there, and thence are distributing again either back into the same trough portion or into the other trough portion. In this operation, the conveying work of the vanes is intended to be such that it is actually left substantially to the chocolate mass which has been conveyed to the center and has been lifted there, itself to choose the direction in which to distribute. Thus, in this region, the vanes are no longer required to continue their conveying action in the direction of the periphery because then, same as is the case with the known machine types, the chocolate mass would only be pushed around continuously.

As regards the construction thereof, the solution in accordance with the invention is characterized in that the twin trough and the two rotating shafts are arranged obliquely with respect to the vertical plane and the vanes are respectively projecting substantially at right angle from the shafts and are in themselves twisted such that at least the outer end portions of their flat areas are disposed substantially in a horizontal plane in the area between the two shafts. By this oblique arrangement of the twin trough and the rotating shafts in connection with the special shape of the vane it is obtained that in the direction of rotation provided for the loosening process those vanes which are just disposed towards the center of the twin trough are leaving the chocolate mass in an upward direction (said chocolate mass, in its fluid condition or in a condition in which it may be poured, has a tendency to level in a horizontal plane), and then dip into it again. These vanes are then entering again in the deep portion of the mass disposed in the lower part of the trough, lifting the chocolate mass, and conveying it towards the center of the twin trough. In the region of this center, however, the conveying action no longer has any thrust component in the peripheral direction owing to the peculiar position of the vanes which are extending substantially in parallel with the surface "level" of the chocolate in this region, and the mass is no longer positively advanced in a peripheral direction by one and the same vane, but may randomly distribute laterally. Thus, the mass is continuously lifted in the center of the trough with all gaps formed in this manner being filled in again by shovelling. By this oblique position it is likewise obtained that the eavporation surface is substantially increased because the surface level is then extending diagonally.

An improvement of the invention is obtained in that the two shafts are driven in opposed senses so that the chocolate mass is heaped up from both sides in the center of the twin trough and may thereupon distribute in a manner very advantageous to the loosening action.

A considerable improvent of the machine in accordance with the invention is obtained in that it is arranged in such a manner that the shafts may be driven in both directions of rotation. For this purpose provision has been made for the shafts provided with the vanes to be driven in the other direction of rotation during the emulsifying process which follows the loosening action so that the shafts are then working in a downward direction from above and are thus effecting a kneading pressure on the mass lying at the bottom.

In an advantageous embodiment, the twin trough is arranged obliquely to the vertical plane by about 30°. This has proved to be the most favourable arrangement for the two different working processes in which the vanes are at the one time carrying out a loosening, and at the other time of kneading action. It is furthermore advantageous to dimension the twin trough and the vanes in such a manner that the vanes are covering a common region disposed between the shafts at least by their radial end portions, so that the vanes are moving the chocolate mass towards each other in the center of the twin trough, i.e., one vane of the one shaft conveys the mass into the cavity of the other half of the trough that has been shovelled free just a moment before by a vane of the other shaft, and vice versa.

Further characterizing features and advantages of the invention result from the following specification of an embodiment shown by way of example in the drawings in connection with the patent claims.

Figure 2:
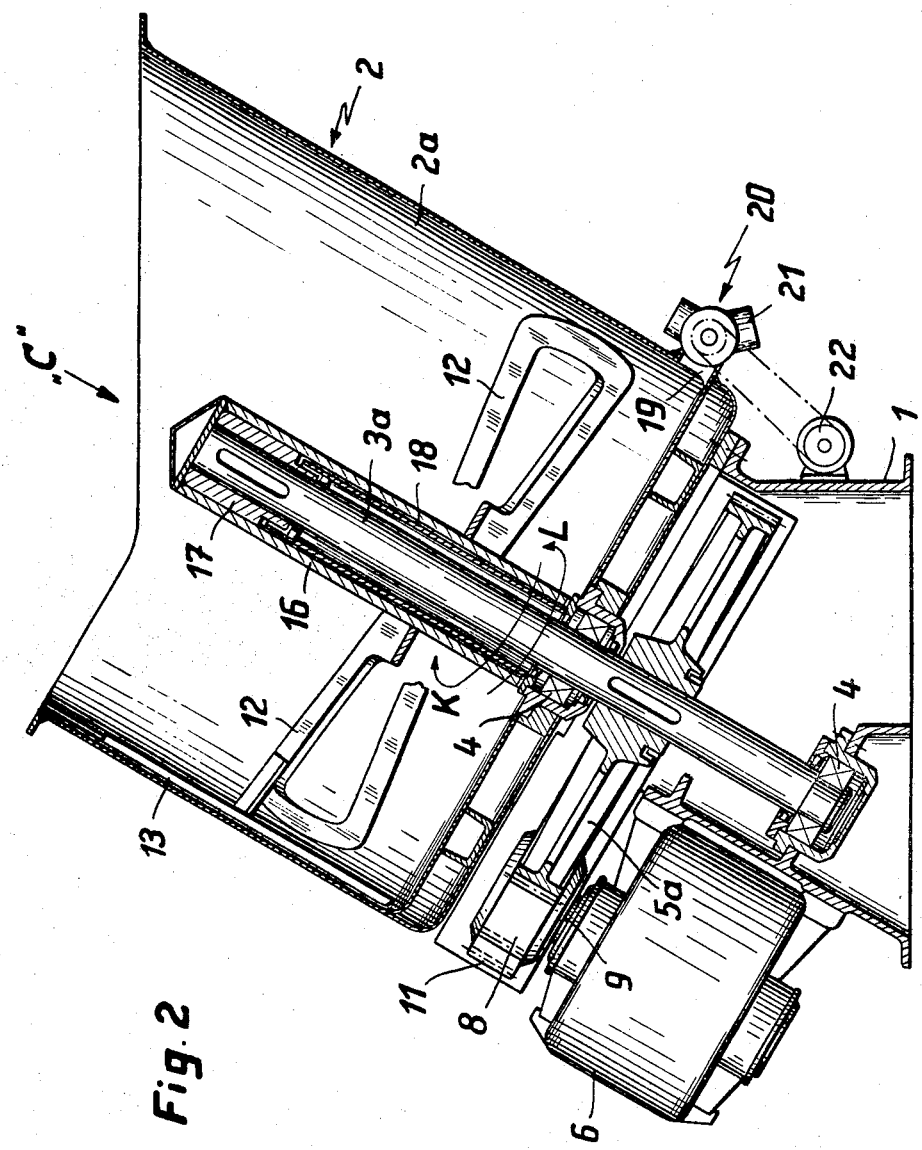
Figure 3:
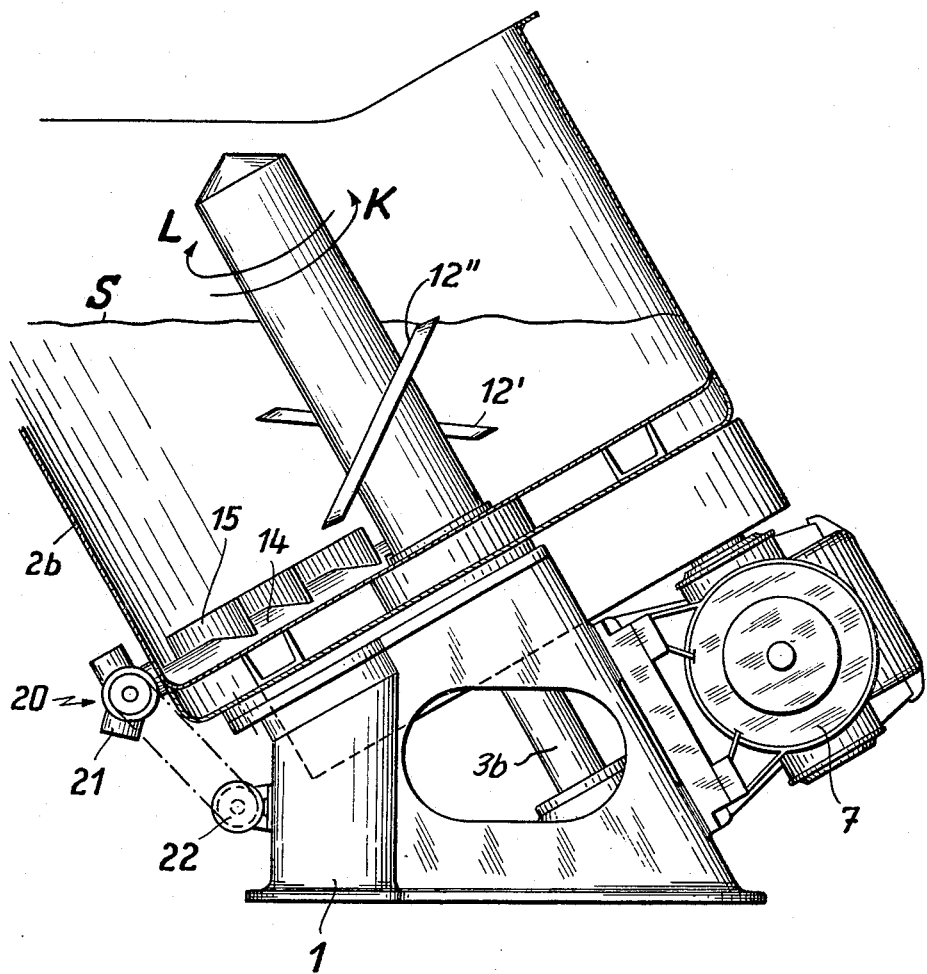

In the drawings:

FIG. 1 is a top plan view taken of the machine in the direction of the arrow C in FIG. 2, FIG. 2 shows a sectional view of the machine taken on line A–B in FIG. 1, FIG. 3 is a sectional view of one half of the trough of the machine taken on line D–E of FIG. 1, looking in a direction towards the center of the twin trough, in which the vanes situated on the shaft shown are aligned in a center plane.

An open topped twin trough 2 formed of two halves intersecting each other in the plan view and designated as individual trough portions 2a and 2b is arranged obliquely with respect to the vertical plane by 30° on a machine underframe 1. In the underframe of the machine, there are additionally rotatably supported in bearings 4, two shafts 3a, 3b extending in parallel and arranged on the center axes of the individual trough portions 2a and 2b. On each shaft 3a and 3b, gears 5a and 5b, respectively, are wedged-on within the space surrounded by the machine underframe, said gears 5a and 5b, respectively, being connected with a drive motor 7 likewise carried by the machine underframe via further gears with the interposition of a gearing 6, for instance a bevel gear.

Provision is made for the shafts 3a, 3b to rotate in opposed directions. For this purpose a gear 8 fastened on the gear output shaft 9 is engaging in the one gear 5a which is seated on the one rotary shaft 3a. Simultaneously, there is engaging in this gear 8, a freely running gear 11 arranged on an outwardly extended intermediate shaft 10 of the gearing 6, which gear 11 then in its turn engages within the gear 5b in the other rotatable shaft 3b. In this manner it is possible to obtain, with little technical expense, and without the gears 5a and 5b seating on the shafts engaging one within the other, an opposed direction of rotation of the shafts 3a and 3b.

As is shown by the FIGS. 2 and 3, the shafts 3a and 3b are engaging within the open-topped trough inner space. In this inner space, there are fastened to each shaft at the same working level and in parallel with the bottom of the trough, two diameterically opposed vanes 12, namely in correspondence with FIG. 1 in such a manner that the vanes of the two shafts 3a and 3b are not aligned in the same direction with respect to each other but displaced from each other by half a vane interval. The flat areas of the vanes of each shaft designated 12′ and 12″ in FIG. 1 in the right-hand trough portion 2b, and in FIG. 3, are in themselves twisted in such a manner that the flat area of the vanes respectively disposed in the region of plane between the two shafts 3a and 3b is extending horizontally. This is very well visible at the vane 12′ in FIG. 3. Thus, in this region between the two shafts, the vane 12′ (and after half a rotation also the vane 12″) is in a position in which it is lying in parallel with the likewise almost horizontal "level" of the chocolate mass. In FIG. 3, the level of the chocolate mass is indicated for instance at S. The direction of rotation which is maintained during the loosening process, is indicated at L. As regards the emulsifying process, the direction of rotation is inverted, so that the shaft is rotating in a direction designated K (please see FIG. 3) and the vanes are exerting a kneading effect. For this purpose, the individual vanes are perforated as is shown in the drawings.

As is shown in FIG. 1, the twin trough 2 and the size of the vanes 12 are dimensioned such that they are overlapping each other to a relatively great extent, i.e. that they are in common covering a relatively great region in the center of the twin trough.

At a vane of each shaft 3a and 3b, there is respectively fastened a radial scraper 13 which is cooperating with the walls of the respective individual trough portion 2a or 2b aligned in the same direction as the shafts. Likewise, each shaft respectively drives one bottom scraper 14 which, as shown in FIGS. 1 and 3, possesses upwardly protruding baffles 15. These baffles are obliquely adjusted with respect to a circular line disposed concentrically of the shaft, namely in such a manner that they are conveying inwardly from outside with the direction of rotation L (loosening) and outwardly from inside with a direction of rotation K (kneading). The radial scrapers 13 and the bottom scraper 14 are designed in such a manner that they are effective in both directions of rotation.

As is shown in FIG. 2, the vanes 12 are not fastened directly to the shaft 3a and 3b, respectively, but to a pipe member 16, which in turn is fastened as 17, to the head of the shaft and reaches as far as to the bottom of the stationary twin trough 2, except for a small movement clearance. The shafts 3a and 3b, respectively and the respective pipe member 16 are, in this construction, arranged radially spaced. The interspace thus created has engaging therein a stationary sleeve 18 extending upwardly from the bottom of the trough which extends beyond the level of the mass of chocolate provided in the twin trough. In this manner an effective labyrinth packing is respectively formed for the shafts 3a and 3b extending from the twin trough, which labyrinth is higher than the highest level to be expected of the chocolate mass capable of flowing.

In order to empty the twin trough, tapping openings 19 are respectively provided at the deepest point of the individual trough portions 2a and 2b from which a worm conveyor device 20 provides a connection to an interposed common collecting line 21. For operating the worm conveyor device 20 which preferably comprises one single worm with two different worm-portions conveying from each end towards the center, a motor 22 is provided at the underframe 1.

The driving motor 7 for the rotatable shafts 3a and 3b is suited for forward and reverse drive and for two speeds in a ratio of 1:2. The reversal of the direction of rotation of the two shafts may thus be obtained from the driving motor in a simple manner.

As will be seen in the drawing, the individual vanes are not extending as far as to the bottom surface of the trough but have their lower edge spaced from the bottom a distance equal to about one sixth of the height of the trough.

Due to the oblique arrangement of the twin trough 2 in connection with the vanes 12 the flying circles of which are overlapping, a loosening of the powdered chocolate mass which is especially charged into the twin trough from a rolling mill is effected in the one direction of rotation L in which the inwardly disposed vanes 12′ are extending upwardly, in that the chocolate mass is lifted from the bottom portion of the trough and is conveyed into the cavity of the opposed trough half which has just shortly before been shovelled free by the vanes of the opposite shaft. The vanes of the opposite trough half are carrying out the same operation so that in the center of the trough there is effected a constant lifting and mutual shovelling of the mass to fill-in the gaps.

As already described, the vanes are not extending as far as to the bottom surface but only as far to one sixth of the height of the trough (in this, the term height of trough is understood to mean the lowermost height of an edge of a trough). But closely behind one of the vanes of each shaft, there is extending the bottom scraper 14 which loosens the lower part of the mass and displaces it through the baffles 15 fitted in a radial direction.

As soon as the mass of the chocolate has been sufficiently dehumidized, the condition thereof will pass over into a more doughy state. At this moment, an intensive emulsifying operation may be started. For this purpose, the direction of rotation of the machine will be reversed. The vanes are now working in the direction K of the shafts in their region with their flat surface downwardly from above and are thus exerting a kneading pressure on the mass lying at the bottom. As the mass has to be pushed along the circular outer wall and along the bottom of the twin trough, it will considerably oppose the vanes so that a strong pressing and kneading effect will occur. For this reason, the vanes, as already stated, have their surfaces perforated as is generally usual with kneading shovels.

After further liquefaction by this process and by the addition of the necessary cocoa fat, a considerable liquefaction is taking place and the required motor output is strongly reduced. At this moment, the reversible motor will be switched on double speed whereby the liquid conching process will likewise be intensified as much as possible.

The emptying of the finished, liquid chocolate mass will then take place at the two deepest points of the twin trough by the common worm conveyor device 20 which is at the same time effective as a conveyor pump and conveys the mass to storage containers erected at remote places.

What I claim is:

1. A machine for treating powdery and pasty masses, especially for dry-conching and emulsifying chocolate masses, comprising a machine-frame, an open-topped twin trough mounted on said machine-frame and formed of two cylindrical and substantially parallel halves intersecting each other in the plan view, a rotatable shaft in each half of said twin trough, said shafts being directed substantially in parallel to the axes of said cylindrical halves, driving means for said shafts, each shaft having at least one protruding vane, said halves of said twin trough and said rotatable shafts being arranged obliquely with respect to the vertical, said vanes each radially extending from the associated shaft and having a substantially planar end portion, said vanes end portions being obliquely related to the associated shaft so that said end portions are disposed in a substantially horizontal position in the region between said shafts.

2. A machine for treating powdery and pasty masses, especially for dry-conching and emulsifying chocolate masses, comprising a machine-frame, an open-topped twin trough mounted on said machine-frame and formed of two substantially parallel halves intersecting each other, a rotatable shaft in each half of said twin trough, said shafts being directed substantially in parallel to said halves, driving means for driving said shafts in opposed directions, each shaft having at least one radially protruding vane, said halves of said twin trough and said rotatable shafts being arranged obliquely with respect to the vertical, said vanes each having a substantially flat end portion obliquely related to the associated shaft whereby said end portions are disposed in a substantially horizontal position in the region between said shafts.

3. A machine for treating powdery and pasty masses, especially for dry-conching and emulsifying chocolate masses, comprising a machine-frame, an open-topped twin trough mounted on said machine-frame and formed of two halves intersecting each other in the plan view, a rotatable shaft in each half of said twin trough, driving means for said shafts, said driving means being so designed that said shafts selectively may be driven in both directions of rotation, each shaft having at least one radially protruding vane, said halves of said twin trough and said rotatable shafts being arranged obliquely with respect to the vertical, said vanes each having a substantially flat end portion obliquely related to the associated shaft whereby said end portions are disposed in a substantially horizontal position in the region between said shafts.

4. A machine for treating powdery and pasty masses, especially for dry-conching and emulsifying chocolate masses, comprising a machine-frame, an open-topped twin trough mounted on said machine-frame and formed of two substantially cylindrical and substantially parallel halves intersecting each other, a rotatable shaft in each half of said twin trough, driving means for said shafts, each shaft having at least one radially protruding vane, said halves of said twin trough and said rotatable shafts being arranged obliquely with respect to the vertical by about 30°, said vanes each having a substantially flat end portion obliquely related to the associated shaft whereby said end portions are disposed in a substantially horizontal position in the region between said shafts.

5. A machine for treating powdery and pasty masses, especially for dry-conching and emulsifying chocolate masses, comprising a machine-frame, an open-topped twin trough mounted on said machine-frame and formed of two substantially parallel halves intersecting each other, a rotatable shaft in each half of said twin trough, said shafts being directed substantially in parallel to said halves, driving means for said shafts, each shaft having at least one radially protruding vane, said halves of said twin trough and said rotatable shafts being arranged obliquely with respect to the vertical, said twin trough and said vanes are so designed that at least the radial outer end portions of said vanes are covering a common region between said shafts.

6. A machine for treating powdery and pasty masses, especially for dry-conching and emulsifying chocolate masses, comprising a machine-frame, an open-topped twin trough mounted on said machine-frame and formed of two substantially parallel halves intersecting each other, a rotatable shaft in each half of said twin trough, said shafts being directed substantially in parallel to said halves, driving means for driving said shafts in opposed directions, said driving means being so designed that said shafts selectively may be driven in both directions of rotation, each shaft having at least two radially protruding vanes in one working level, all vanes of said two shafts being disposed in one and the same working level, said halves of said twin trough and said rotatable shafts being arranged obliquely with respect to the vertical by about 30°, said vanes each having a substantially flat end portion obliquely related to the associated shaft whereby said end portions are disposed in a substantially horizontal position in the region between said shafts, said twin trough and said vanes are so designed that at least said radial outer end portions of said vanes are covering a common region between said shafts.

7. A machine for treating powdery and pasty masses, especially for dry-conching and emulsifying chocolate masses, comprising a machine-frame, an open-topped twin trough mounted on said machine-frame and formed of two substantially parallel halves intersecting each other, a rotatable shaft in each half of said twin trough, said shafts being directed substantially in parallel to said halves, driving means for said shafts, said driving means being so designed that said shafts selectively may be driven in both directions of rotation, each shaft having at least one radially protruding vane, said halves of said twin trough and said rotatable shafts being arranged obliquely with respect to the vertical, said vanes being perforated in a vertical direction.

8. A machine for treating powdery and pasty masses, especially for dry-conching and emulsifying chocolate masses, comprising a machine-frame, an open-topped twin trough mounted on said machine-frame and formed of two cylindrical and substantially parallel halves intersecting each other, a rotatable shaft in each half of said twin trough, said shafts being directed substantially in parallel to said halves, driving means for said shafts, each shaft having at least one radially protruding vane, said halves of said twin trough and said shafts being arranged obliquely with respect to the vertical, said vanes having radial scrapers at their radial outer end portions, said scrapers extending in parallel with said shafts and cooperating with the peripheral wall of said twin trough.

9. A machine for treating powdery and pasty masses, especially for dry-conching and emulsifying chocolate masses, comprising a machine-frame, an open-topped twin trough mounted on substantially parallel halves intersecting each other, a rotatable shaft in each half of said twin trough, substantially in parallel to said halves, driving means for said shafts, each shaft having at least one radially protruding vane, said halves of said twin trough and said shafts being arranged obliquely with respect to the vertical, said vanes each having a substantially flat end portion obliquely related to the associated shaft whereby said end portions are disposed in a substantially horizontal position in the region between said shafts, said vanes of said two shafts being disposed in one and the same working level, the lower edge of said vanes being spaced from the bottom of said twin trough by about one sixth of the lowest height of the upper edge of said twin trough.

10. A machine for treating powdery and pasty masses, especially for dry-conching and emulsifying chocolate masses, comprising a machine-frame, an open-topped twin trough mounted on said machine-frame and formed of two substantially parallel halves intersecting each other, a rotatable shaft in each half of said twin trough, said shafts being directed substantially in parallel to said halves, driving means for said shafts, said driving means being so designed that said shafts selectively may be driven in both directions of rotation, each shaft having at least one radially protruding vane, said halves of said twin trough and said shafts being arranged obliquely with respect to the vertical, at least one bottom scraper fastened on each of said shafts said bottom scrapers cooperating with the bottom of said twin trough and being effective in both directions of rotation.

11. A machine according to claim 10 wherein said bottom scrapers include baffles protruding upwardly and directed obliquely outward relative to the associated shaft.

12. A machine for treating powdery and pasty masses, especially for dry-conching and emulsifying chocolate masses, comprising a machine-frame, an open-topped twin trough mounted on said machine-frame and formed of two substantially parallel halves intersecting each other, a rotatable shaft in each half of said twin trough, said shafts being directed substantially in parallel to said halves, driving means for driving said shafts in opposed directions, said driving means comprising a motor driven gearing having an outwardly extended intermediate shaft and an outwardly extended output shaft, a first gear on each shaft of said twin trough, a second gear on said output shaft of said gearing engaging within the one of said first gears of said twin trough, a third gear freely rotatably mounted on said outwardly extended intermediate shaft of said gearing and engaging within the other of said first gears of said twin trough, each shaft having at least one radially protruding vane, said halves of said twin trough and said shafts being arranged obliquely with respect to the vertical.

13. A machine for treating powdery and pasty masses, especially for dry-conching and emulsifying chocolate masses, comprising a machine-frame, an open-topped twin trough mounted on said machine-frame and formed of two substantially parallel halves intersecting each other, a rotatable shaft in each half of said twin trough, said shafts being directed substantially in parallel to said halves, driving means for said shafts, said driving means being so designed that said shafts selectively may be driven in both directions of rotation and said driving means comprising a motor having at least two speeds, each shaft having at least one radially protruding vane, said halves of said twin trough and said shafts being arranged obliquely with respect to the vertical, said vanes each having a substantially flat end portion obliquely related to the associated shaft whereby said end portions are disposed in a substantially horizontal position in the region between said shafts.

14. A machine according to claim 13 wherein said two speeds of said motor are of a ratio of 1:2.

15. A machine for treating powdery and pasty masses, especially for dry-conching and emulsifying chocolate masses, comprising a machine-frame, an open-topped twin trough mounted on said machine-frame and formed of two substantially parallel halves intersecting each other, a rotatable shaft in each half of said twin trough, said shafts being directed substantially in parallel to said halves, driving means for said shafts, each shaft having at least one radially protruding vane, said halves of said twin trough and said shafts being arranged obliquely with respect to the vertical, the bottom of said twin trough being at substantially right angles to said shafts and having a deepest portion in each half, a tapping opening in the wall of said twin trough at each of said deepest portions, a worm conveyor device communicating with said tapping openings, a collecting line, said worm conveyor feeding from said tapping openings to said collecting line.

16. A machine for treating powdery and pasty masses, especially for dry-conching and emulsifying chocolate masses, comprising a machine-frame, an open-topped twin trough mounted on said machine-frame and formed of two substantially parallel halves intersecting each other, a rotatable shaft in each half of said twin trough, said shafts extending through the bottom of said twin trough and being oriented substantially in parallel to said halves, driving means for said shafts, pipe members surrounding said shafts and interengaging in parallel to said shafts to form a labyrinth packing, said labyrinth packing extending beyond the normal level of said masses to be treated in said twin trough, each shaft having at least one radially protruding vane said halves of said twin trough and said shafts being arranged obliquely with respect to the vertical, said vanes each having a substantially flat end portion obliquely related to the associated shaft whereby said end portions are disposed in a substantially horizontal position in the region between said shafts.

References Cited by the Examiner
UNITED STATES PATENTS

| | | | |
|---|---|---|---|
| 514,048 | 2/1894 | Wagner | 259—41 |
| 2,216,777 | 10/1940 | Hollstein | 99—236 |
| 2,673,802 | 3/1954 | Hansen | 259—6 X |

FOREIGN PATENTS

| | | |
|---|---|---|
| 1,073,289 | 1/1960 | Germany. |

WILLIAM I. PRICE, *Primary Examiner.*